Oct. 20, 1970     M. S. BLOOM     3,535,198
STRUCTURAL LAMINATE HAVING A FOAMED CORE AND TWO RIGID FACES
Filed Nov. 14, 1967
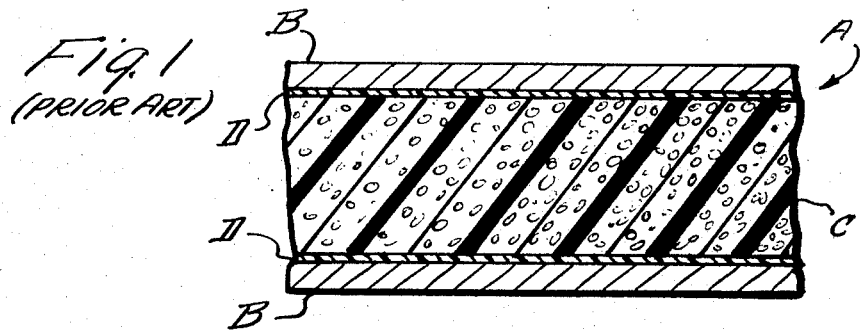
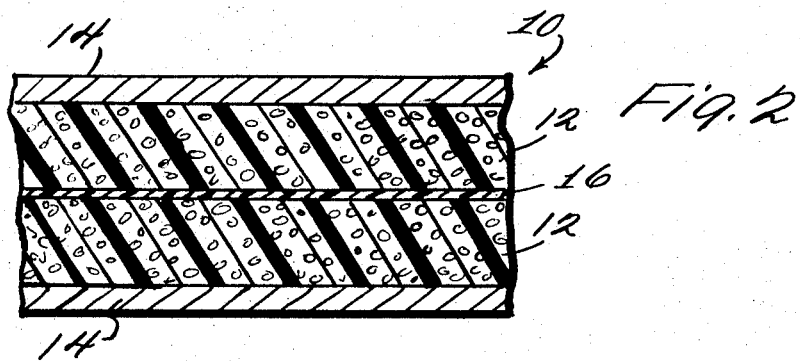
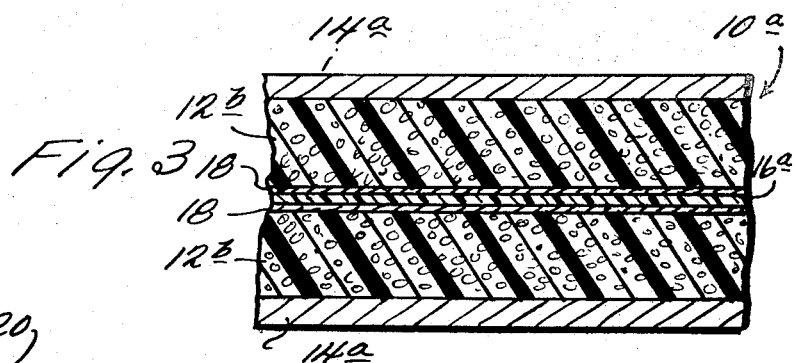
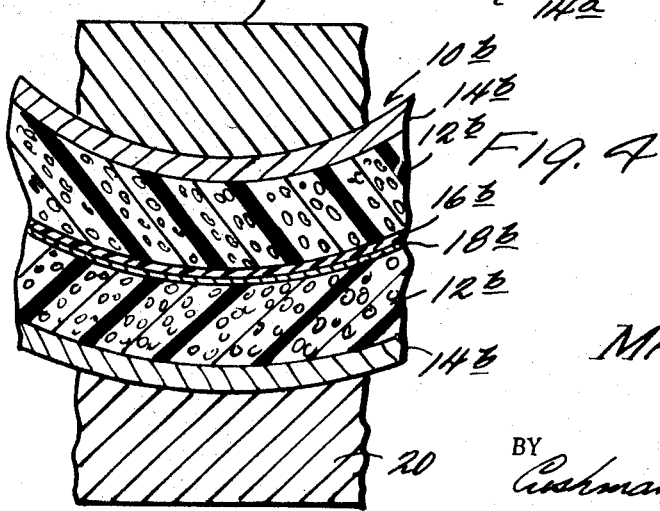
INVENTOR
MARTIN S. BLOOM
BY Cushman, Darby & Cushman
ATTORNEYS United States Patent Office 3,535,198
Patented Oct. 20, 1970

3,535,198
STRUCTURAL LAMINATE HAVING A FOAMED CORE AND TWO RIGID FACES
Martin S. Bloom, Norton-on-Tees, England, assignor to Imperial Chemical Industries Limited, London, England, a corporation of Great Britain
Filed Nov. 14, 1967, Ser. No. 682,964
Claims priority, application Great Britain, Nov. 14, 1966, 50,912/66
Int. Cl. B32b 5/20, 5/22, 3/08
U.S. Cl. 161—161      4 Claims

ABSTRACT OF THE DISCLOSURE

A laminated panel is constructed by generating a polyurethane or cyclic ether foam in situ on each of two substantially rigid facing sheets to form two half-laminates and then bonding the half-laminates together along their foam interface with an adhesive selected from the group consisting of urea-, phenol- and resorcinol-formaldehyde, impact latex adhesives and bitumen compounds. The foam interface may include a flexible sheet, such as paper, associated with one or both of the half-laminates.

---

The present invention relates to the production of a laminated building panel of the type having a foamed core of polyurethane or a cyclic ether, and two rigid (or almost rigid) outer facing sheets, for example of metal, asbestos cement, cast plaster, plasterboard, or of plastics materials such as polyvinyl chloride and acrylics, in particular to such laminated building panels for outdoor use as wall or roof panels. Since no satisfactory practical process has so far been devised for foaming polyurethanes or cyclic ethers in situ between such rigid (or almost rigid) facing sheets, it is the practice to form laminated panels of the type described by applying the rigid (or almost rigid) facing sheets to two opposite faces of a block of foam by means of an adhesive. That is to say, two layers of adhesive are required, at least one of which will be protected from the weather merely by a single rigid (or almost rigid) facing sheet.

Practically the only adhesives available for binding foamed polyurethanes or foamed cyclic ethers to rigid (or almost rigid) facing sheets are those listed hereunder together with their approximate costs:

| | Per lb. |
|---|---|
| Urea-formaldehyde | 9½ d.–1/ 11 d. |
| Phenol-formaldehyde | 1/1 d.–1/ 5 d. |
| Resorcinol-formaldehyde | 3/ 2 d. |
| Polyvinyl acetate | 1/ 11 d. |
| Impact latex (neoprene) | 2/ 7½ d. |
| Impact latex (water emulsion) | 1/ 11 d. |
| Bitumen compounds | 6 d. |
| Epoxies and polyesters | 8/10 d. |

However, not all of these are suitable if the laminated building panel, or one face thereof, is intended to be exposed to the weather. In such circumstances the first three adhesives, namely urea-, phenol- and resorcinol-formaldehyde, are unsuitable on account of the brittleness of the glue bond, the tendency of urea-formaldehyde and phenol-formaldehyde to react with asbestos cement and, in the case of urea-formaldehyde, its water-solubility. Differential expansion of the adjacent rigid (or almost rigid) facing sheet causes the glue bond to be strained and finally severed in the case of all three of these adhesives. Polyvinyl acetate is unsuitable since, in order to bond, it must lose water, and it cannot do so when applied between an impervious rigid (or almost rigid) facing sheet and a block of foam. In the case of impact latex adhesives, they lose their bonds, particularly to metal and asbestos cement, when the adjacent rigid (or almost rigid) facing sheet is heated, and it is pointed out that when used on the exterior of a building, the rigid (or almost rigid) facing sheets may attain a temperature of the order of 80° C. to 100° C. Such high temperatures also preclude the use of bitumen compounds. Polyvinyl acetate is also unsuitable for the reason given above. In fact, the only adhesives which are fully satisfactory for this purpose are epoxies and polyesters which cost, unfortunately, some 2½ to 18 times as much as the other (unsatisfactory) adhesives.

The aforementioned objections to urea-, phenol- and resorcinol-formaldehyde, impact latex adhesives and bitumen compounds do not arise when they are used for glueing together polyurethane foam or cyclic ether foam interfaces, or flexible interfaces (e.g. paper interfaces) backed by such foams, since the foam acts as a thermal insulant and therefore protects the adhesive from the effects of heat, the foam is waterproof and therefore protects the adhesive from the effects of moisture, and the foam is elastic and therefore protects the adhesive bond from mechanical damage.

Polyurethane and cyclic ether foams can be generated in situ on or against a rigid (or almost rigid) facing sheet to form a laminate, for example as described in British Pats. Nos. 997,086 and 1,053,192 (corresponding U.S. application Ser. No. 458,237 filed Mar. 24, 1965, now abandoned) and the bond so formed between the foam and the rigid (or almost rigid) facing sheet is at least as satisfactory as the bond formed by glueing a preformed block of foam to a rigid (or almost rigid) facing sheet by means of an epoxy resin or polyester resin. The other face of the foam may be uncovered, or it may be provided with a flexible facing sheet, e.g. paper which conveniently is removable, for example by stripping off.

The invention will be further understood from the following detailed description taken with the drawing in which:

FIG. 1 is a sectional view of a laminated panel constructed in accordance with previously known techniques; and FIGS. 2, 3 and 4 are sectional views of three different laminated panels, each of which embodies the principles of the present invention.

FIG. 1 illustrates a panel A constructed according to prior techniques by applying each of two facing sheets B to a block of foam C by means of an adhesive D.

According to the present invention, there is provided a laminated panel of the type described, comprising two laminates each comprising a polyurethane or cyclic ether foam generated in situ on or against a rigid (or almost rigid) facing sheet, the face of the foam opposite to said rigid (or almost rigid) facing sheet being uncovered or provided with a flexible facing sheet, e.g. paper, the two laminates being bonded to each other by their foam interfaces or by their foam-backed flexible interfaces, by means of an adhesive selected from urea-, phenol- or resorcinol-formaldehyde, an impact latex adhesive or a bitumen compound.

FIG. 2 illustrates a laminated panel 10 constructed by first generating a foam layer 12 in situ against each of two facing sheets 14 to form two half-laminates and then bonding the half-laminates together with a single layer of adhesive 16 of one of the aforementioned types.

FIG. 3 illustrates a laminated panel 10a constructed by first generating a foam layer 12a in situ against each of two facing sheets to form two half-laminates, the latter being provided with a flexible paper facing sheet 18. Then the half-laminates are bonded together with a single layer of adhesive 16a of one of the aforementioned types.

FIG. 4 illustrates a curved panel 10b constructed similarly to the flat panel of FIG. 3 except that one of the paper facing sheets has been peeled off its half-laminate before the two half-laminates are bonded together. More specifically, the paper has been removed from the upper half-laminate, and the adhesive 16b of the aforementioned types is disposed between the paper sheet 18b of the lower half-laminate and the foam layer 12b of the upper half-laminate, following which the assembly is placed between the parts of a curved press 20.

Laminated building panels according to the invention are thus able to employ the cheaper adhesives, hitherto considered unsuitable, instead of the relatively expensive epoxies and polyesters; in addition, only a single glue line is required (between the foam interfaces or foam-backed flexible interfaces) instead of the two glue lines (one at each rigid or almost rigid, facing sheet) employed hitherto. The cost of adhesives in laminated building panels according to the invention is therefore only about $\frac{1}{5}$ to $\frac{1}{35}$ of their cost in the known laminated building panels in which it has been necessary to use the relatively expensive epoxies and polyesters.

Laminates having an almost-rigid facing sheet (e.g. of metal sheet) may exhibit a slight tendency to "bow," but the effect of this can be counteracted when forming laminated building panels according to this invention by coating the foam interfaces (or foam-backed flexible interfaces) of a pair of laminates with one of the preferred adhesives of the invention and bonding them together, using one of the adhesives of the invention, in a suitable flat press until the bond has set with sufficient strength permanently to overcome the "bowing" effect of one or both laminates.

Conversely, if the almost-rigid facing sheet is one to which a permanent curvature can be imparted, it may be desired to form a curved laminated building panel, in which case a pair of substantially straight laminates are bonded together, using one of the adhesives of the invention, in a suitably curved press.

I claim:
1. A laminated building panel of the type having a foamed core of polyurethane and two substantially rigid outer facing sheets, comprising two laminates each comprising said foam generated in situ on a substantially rigid facing sheet, the two laminates being bonded to each other by their foam interfaces by means of an adhesive selected from the group consisting of urea-, phenol- and resorcinol-formaldehyde adhesives, neoprene-based impact latex adhesives and bitumen adhesives.

2. A laminated building product as claimed in claim 1, wherein the faces of said two laminates opposite to said substantially rigid facing sheets are each provided with a flexible facing sheet, and said two laminates are bonded to each other at their flexible facing sheets by means of said adhesive.

3. A laminated building product as claimed in claim 2, wherein said flexible facing sheet is paper.

4. A laminated building product as claimed in claim 1, wherein said substantially rigid facing sheets are selected from the group consisting of metal, asbestos cement, cast plaster, plasterboard, and plastics materials.

References Cited
UNITED STATES PATENTS

| 2,999,041 | 9/1961 | Lappala | 161—161 |
| 3,197,352 | 7/1965 | Coates | 161—161 |

FOREIGN PATENTS

| 1,362,035 | 4/1964 | France. |

WILLIAM J. VAN BALEN, Primary Examiner

U.S. Cl. X.R.

156—211, 242, 245, 249; 161—190